(12) United States Patent
Alexander et al.

(10) Patent No.: US 8,466,589 B2
(45) Date of Patent: Jun. 18, 2013

(54) STATOR AND METHOD OF ASSEMBLY

(75) Inventors: James Pellegrino Alexander, Niskayuna, NY (US); Ayman Mohamed Fawzi El-Refaie, Niskayuna, NY (US); Xiaochun Shen, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 268 days.

(21) Appl. No.: 12/888,463

(22) Filed: Sep. 23, 2010

(65) Prior Publication Data
US 2012/0074800 A1    Mar. 29, 2012

(51) Int. Cl.
*H02K 9/00*    (2006.01)
(52) U.S. Cl.
USPC ............................................. 310/59; 310/54
(58) Field of Classification Search
USPC ..................................................... 310/52–59
See application file for complete search history.

(56) References Cited

U.S. PATENT DOCUMENTS

| | | | |
|---|---|---|---|
| 5,859,482 A * | 1/1999 | Crowell et al. | 310/58 |
| 7,061,148 B2 * | 6/2006 | Philippart | 310/58 |
| 7,242,119 B2 * | 7/2007 | Gomes De Lima | 310/52 |
| 7,307,363 B2 * | 12/2007 | Pashnik et al. | 310/54 |
| 7,332,837 B2 | 2/2008 | Ward et al. | |
| 7,411,323 B2 | 8/2008 | Pfannschmidt et al. | |
| 2,474,021 A1 | 1/2009 | Perrin | |
| 7,479,716 B2 | 1/2009 | El-Antably et al. | |
| 7,550,882 B2 * | 6/2009 | Verhaegen | 310/58 |
| 7,633,194 B2 | 12/2009 | Dawsey et al. | |
| 7,705,495 B2 | 4/2010 | Alfermann et al. | |
| 2002/0043881 A1 * | 4/2002 | Asao et al. | 310/54 |
| 2004/0212258 A1 * | 10/2004 | Laskaris et al. | 310/54 |
| 2005/0012409 A1 * | 1/2005 | Philippart | 310/54 |
| 2009/0206688 A1 | 8/2009 | Sano et al. | |
| 2010/0072863 A1 | 3/2010 | Robinson et al. | |

* cited by examiner

*Primary Examiner* — Thanh Lam
(74) *Attorney, Agent, or Firm* — Ann M. Agosti

(57) ABSTRACT

The present application provides a stator. The stator may include a number of poles and a stator tip and cooling assembly. The stator tip and cooling assembly may include a number of stator tips with a number of cooling tubes adjacent thereto such that the stator tips align with the poles and the cooling tubes cool the poles.

16 Claims, 8 Drawing Sheets

US 8,466,589 B2

STATOR AND METHOD OF ASSEMBLY

FEDERAL RESEARCH STATEMENT

This invention was made with Government support under Contract No. DE-FC26-07NT43122-GOVT, awarded by the US Department of Energy (DOE). The Government has certain rights in this invention.

TECHNICAL FIELD

The present application relates generally to electrical device components and more particularly relates to a stator with stator tooth tip cooling for use in an electrical motor or a generator and a method of assembling the same.

BACKGROUND OF THE INVENTION

Generally described, electrical devices such as motors and generators have a rotor that is coaxially positioned within a stator for rotation therewith about a shaft. Operational improvements in such electrical devices may focus at least in part on increasing the amount of current that may flow through the stator so as to increase the overall power density.

Increasing the current flow through the stator, however, also may increase the heat generated by the coils therein due to resistive or ohmic heating. Increased rotor speeds thus may lead to increased heat and temperatures. Of particular concern is the stator tooth tip region where a significant portion of the heat losses may be generated. Without sufficient cooling, increases in stator heat thus may limit increases in overall electrical power density.

There is a desire therefore for improved stator cooling systems and methods, particularly about the stator tooth tip region. Such cooling systems and methods should effectively cool the stator, especially at higher speeds, so as to allow for increases in overall power density.

SUMMARY OF THE INVENTION

The present application thus provides a stator. The stator may include a number of poles and a stator tip and cooling assembly. The stator tip and cooling assembly may include a number of stator tips with a number of cooling tubes positioned adjacent thereto such that the stator tips align with the poles and the cooling tubes cool the poles.

The present application further provides a method of assembling a stator. The method may include the steps of winding a number of coils about a number of teeth in a stack, positioning a stator tip and cooling assembly within the stack, and connecting a number of cooling tubes with a cooling manifold. The stator tip and cooling assembly may include a number of stator tips with the cooling tubes adjacent thereto such that the stator tips align with the teeth and the cooling tubes align with the coils.

The present application further provides an electrical device. The electrical device may include a rotor and a stator positioned about the rotor. The stator may include a number of poles and a stator tip and cooling assembly to cool the poles positioned adjacent thereto.

These and other features and improvements of the present application will become apparent to one of ordinary skill in the art upon review of the following detailed description when taken in conjunction with the several drawings and the appended claims.

DETAILED DESCRIPTION

Figure 1:
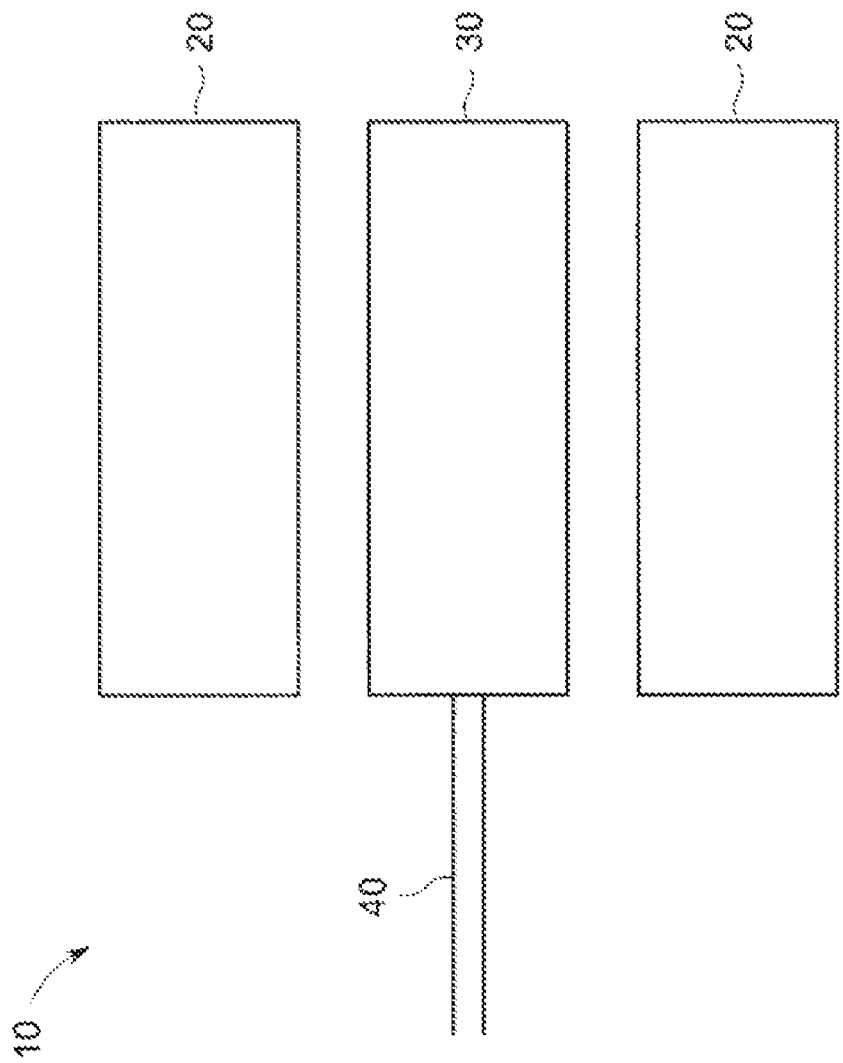
FIG. 1 is a schematic diagram of an electrical device.

Referring now to the drawings, in which like numerals refer to like elements throughout the several views, FIG. 1 shows a schematic view of a known electrical device 10. The electrical device 10 may be an electric motor or a generator. The electrical device 10 may include a stator 20, a rotor 30, and a shaft 40. The stator 20 generally may be annular in shape and may be fixed in place. The rotor 30 may be attached to the shaft 40. The rotor 30 and the shaft 40 may be positioned within the stator 20 for rotation therein. Other configurations and other types of electrical devices may be used herein.

Figure 2:
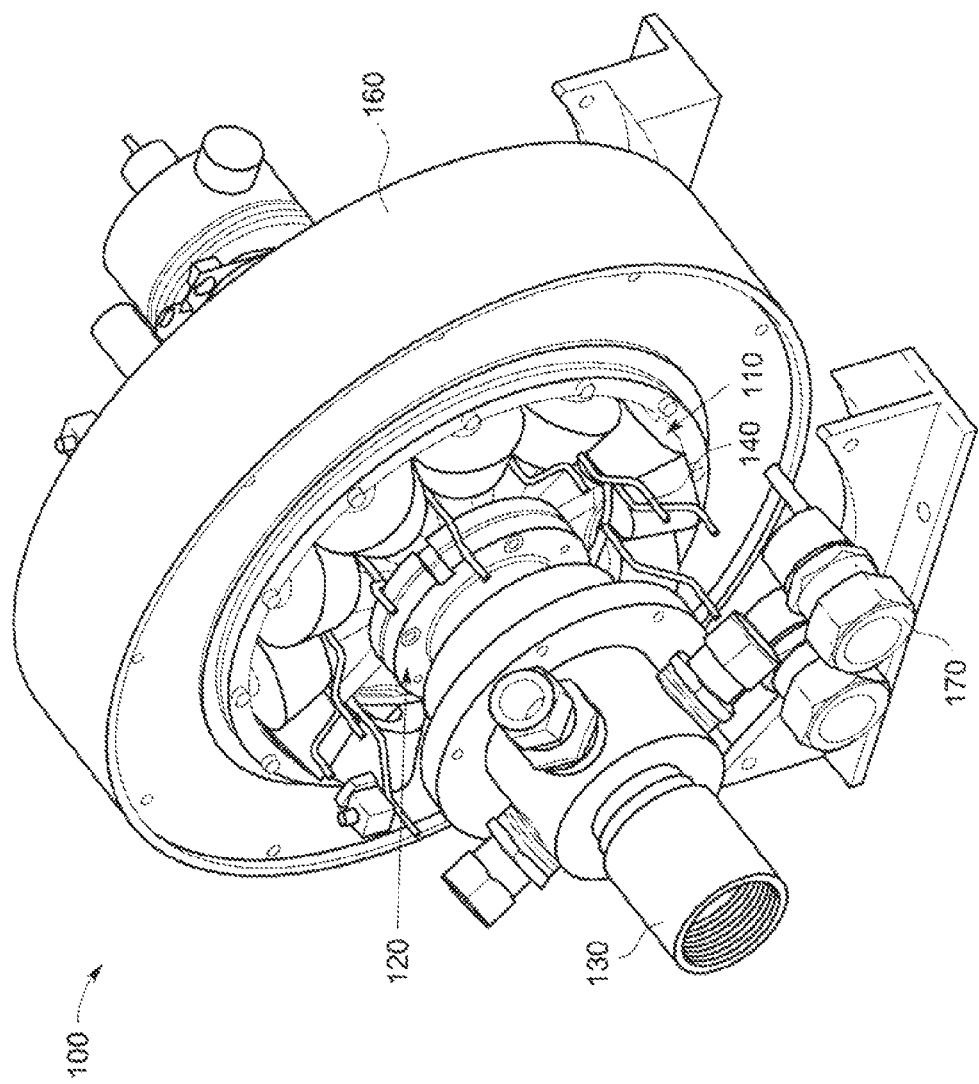
FIG. 2 is a perspective view of the electric device.

FIG. 2 shows an electrical device 100 as may be described herein. Similar to that described above, the electrical device 100 may include a stator 110 with a rotor 120 positioned therein on a shaft 130. As will be described in more detail below, the stator 110 may include a number of poles 140. The stator 110 in general and the poles 140 in particular may include a stator tip and cooling assembly 150. The stator 110 also may include a cooling jacket 160 thereon. The stator tip and cooling assembly 150 and the cooling jacket 160 may be in communication with a cooling manifold 170 for the circulation of a cooling medium therein. Other configurations of the electrical device 100 and the stator 110 may be used herein.

Figure 3:
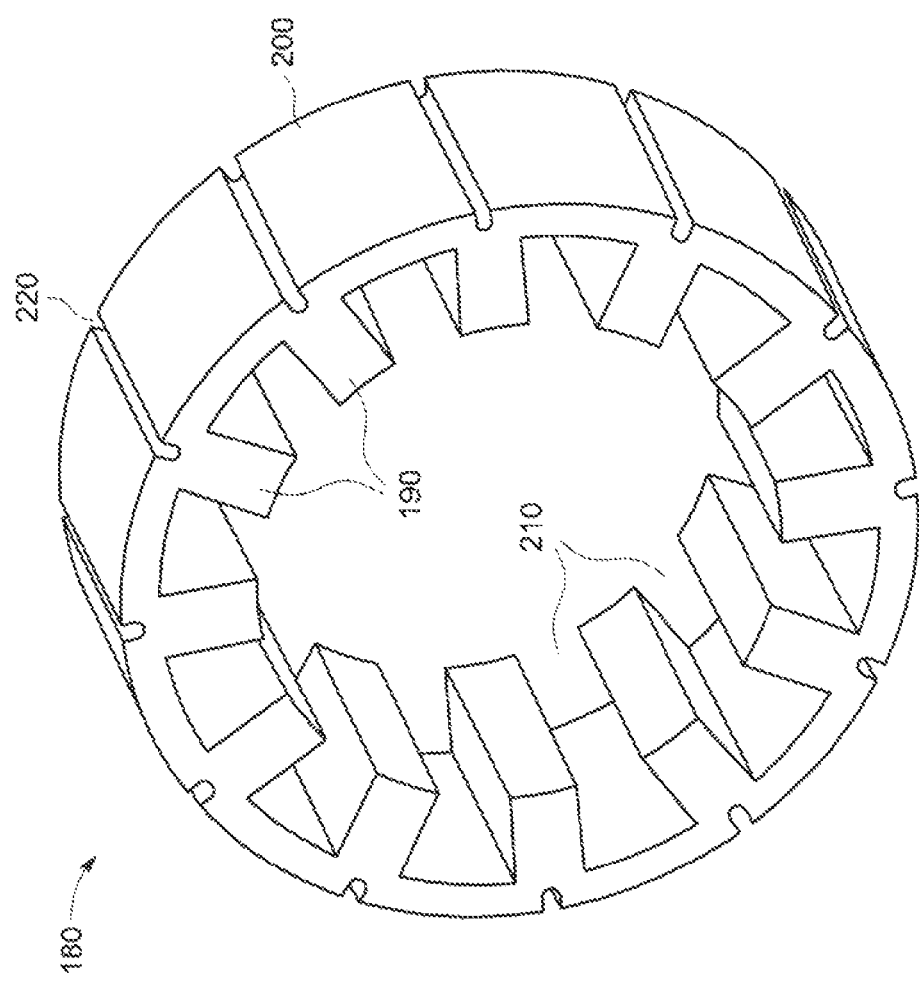
FIG. 3 is a perspective view of a stator lamination stack.

FIGS. 3-8 show the components of the overall stator 110 and the stator tip and cooling assembly 150 in particular. Specifically, FIG. 3 shows a lamination stack 180 as may be used herein. The lamination stack 180 may be in the form of a full loop for improved mechanical strength. The lamination stack 180 may have a number of teeth 190 extending from a yoke 200. The teeth 190 may extend inwardly from the yoke 200 and may define a number of inner slots 210 therebetween. The yoke 200 also may define a number of outer slots 220 on an outside surface. Other lamination stack configurations may be used herein.

Figure 4:
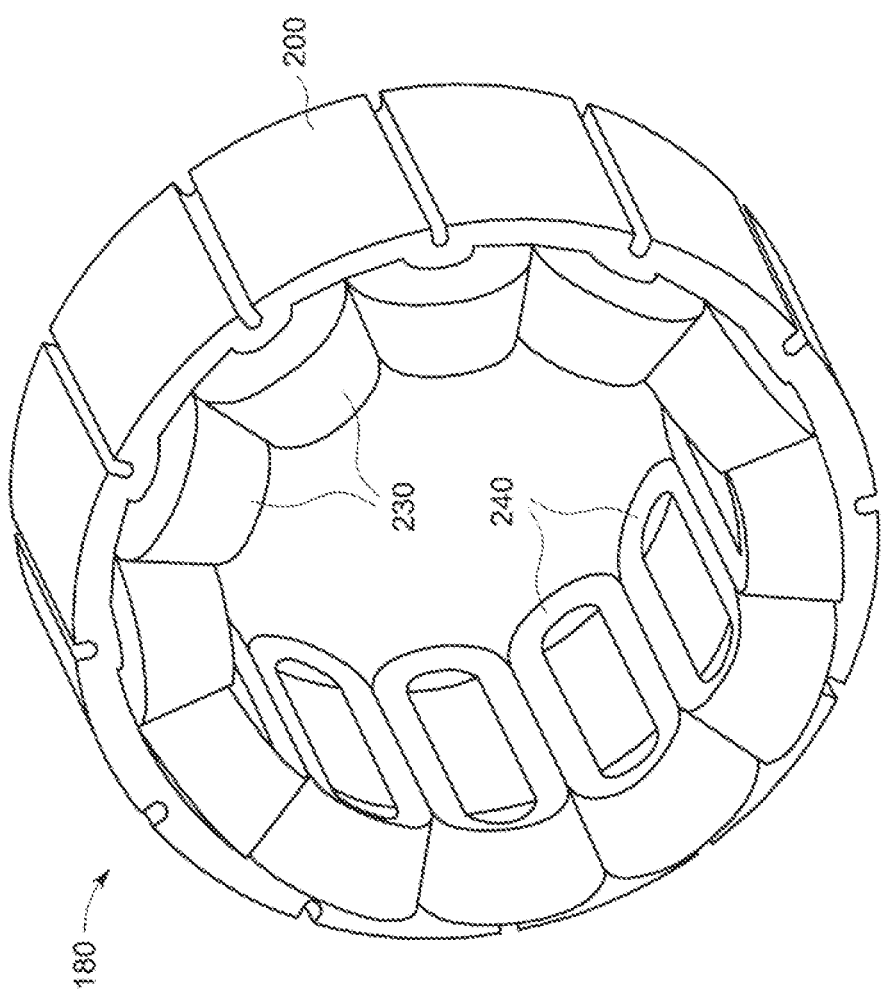
FIG. 4 is a perspective view of the stator lamination stack of FIG. 3 with coils thereon.

FIG. 4 shows the lamination stack 180 with a number of coils 230. One of the coils 230 may be wrapped around each of the teeth 190. The coils 230 may be electrically interconnected such that current is transferable therebetween. The coils 230 may largely fill the inner slots 210 between each tooth 190. The combination of a tooth 190 and a coil 230 may be referred to herein as a pole 240. Although twelve (12) poles 240 are shown, any number of the poles 240 may be used herein. Other configurations may be used herein.

Figure 5:
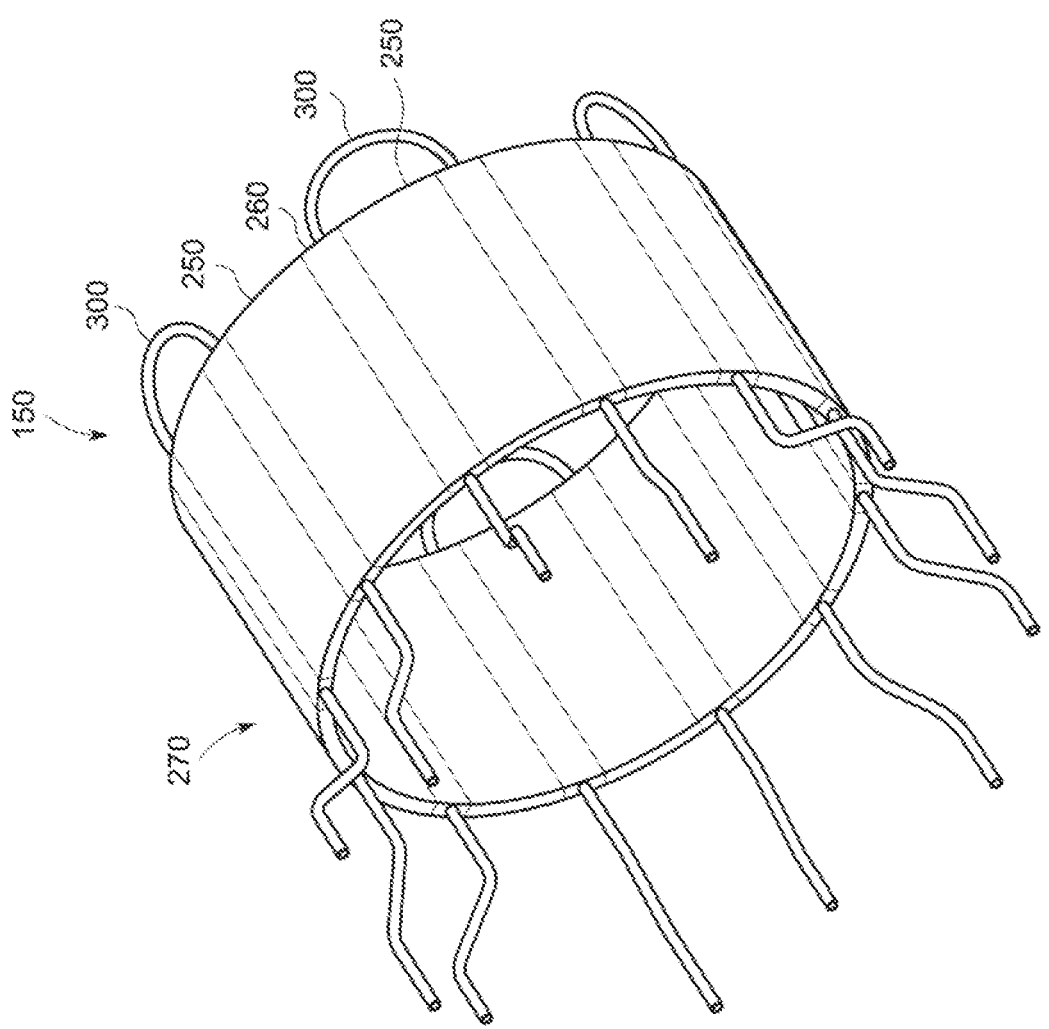
FIG. 5 is a perspective view of a stator tip and cooling assembly.
Figure 6:
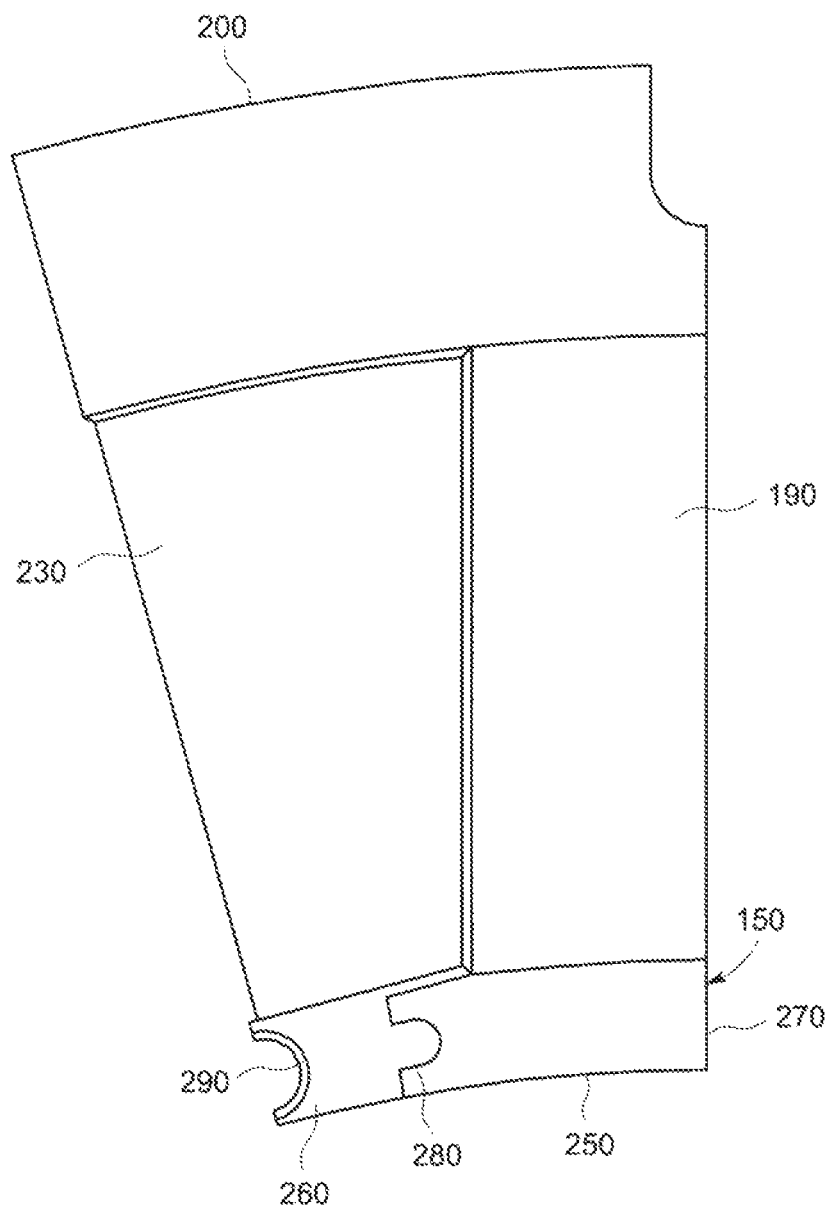
FIG. 6 is a side view of a stator tooth.

FIG. 5 shows an example of the stator tip and cooling assembly 150. The stator tip and cooling assembly 150 may include a number of tooth tips 250 separated by a number of epoxy spacers 260 so as to create a ring subassembly 270. The tooth tips 250 may be sized according to the corresponding tooth 190 of the lamination stack 180. The tooth tips 250 may be punched from laminations with a lamination index and the like. The tooth tips 250 and the epoxy spacers 260 may be arranged in a tongue and groove arrangement 280 as is shown in FIG. 6. The epoxy spacers 260 may be made out of an Al₂O₃ impregnated epoxy or similar types of materials. Other configurations and other materials may be used herein.

The epoxy spacers 260 may include a number of cooling channels 290 therein such that a number of cooling tubes 300 may extend therethrough. One cooling tube 300 may encircle a tooth tip 250 about a tooth 190 such that a stator 110 with, for example, twelve (12) poles 240 may include six (6) cooling tubes 300. The cooling tubes 300 may be in communication with the cooling manifold 170. Other configurations may be used herein.

Figure 7:
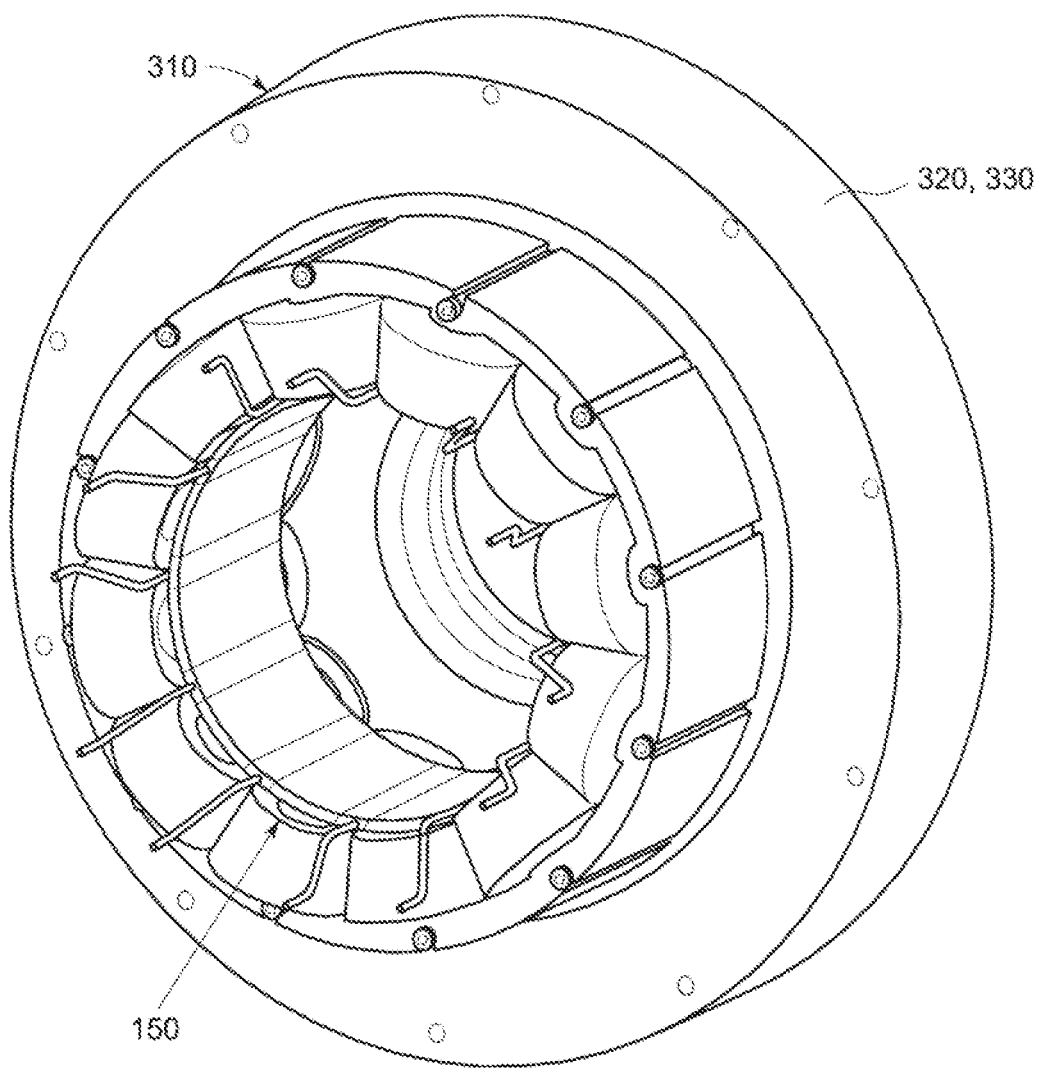
FIG. 7 is a perspective view of the stator assembly with a first end shield.

The combination of the lamination stack 180 with the coils 230 and the stator tip and cooling assembly 150 creates what may be called a stator subassembly 310. When so positioned, the stator tip and cooling assembly 150 also holds the coils 230 of the lamination stack 180 in place. FIG. 7 shows a first end shield 320 attached about one side of the stator subassembly 310.

Figure 8:
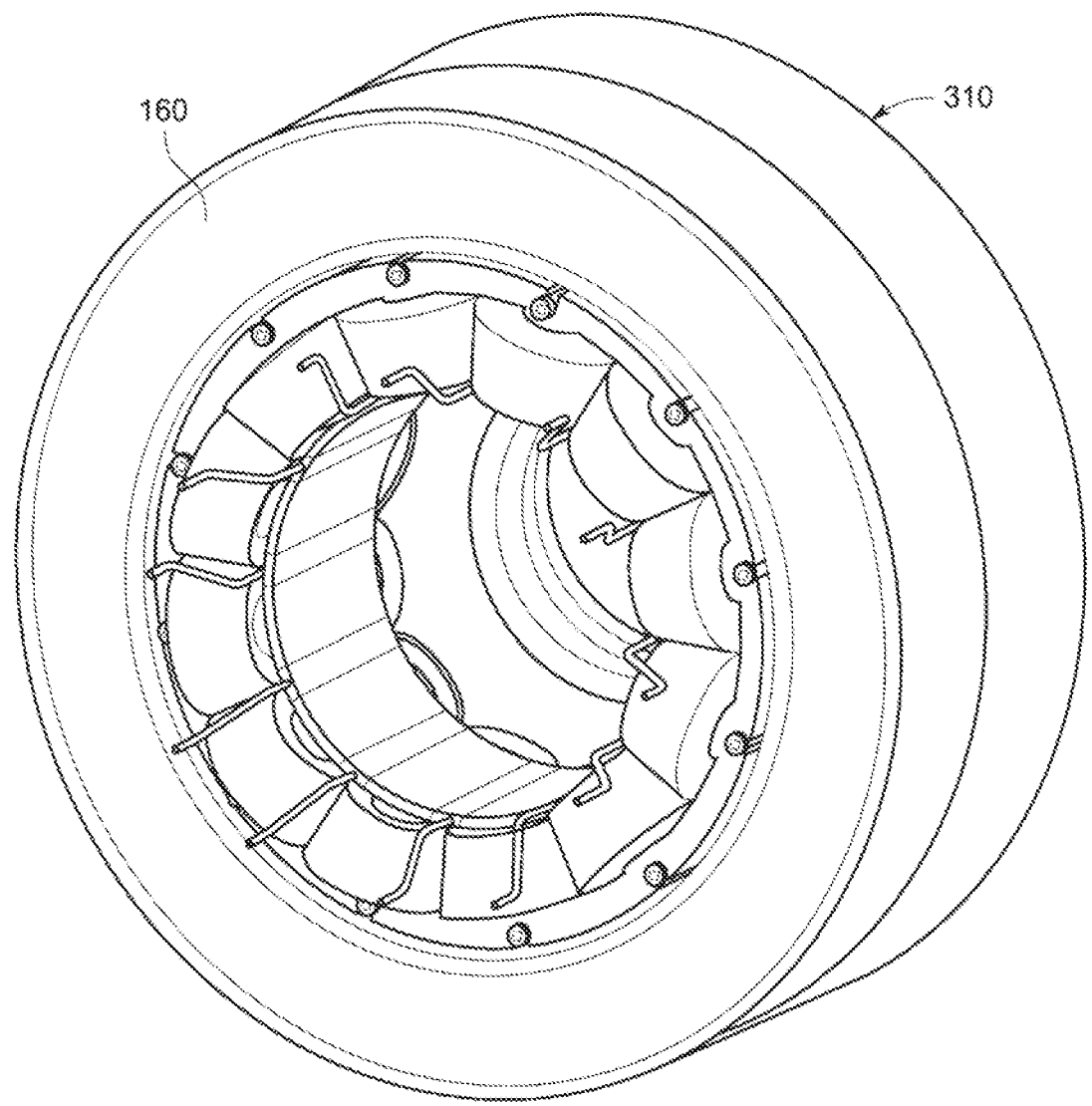
FIG. 8 is a prospective view of the stator assembly with an outer cooling jacket thereon.

FIG. 8 shows the outer cooling jacket 160 positioned about the stator subassembly 310. The outer cooling jacket 160 may be shrunk on to the lamination stack 180 or otherwise attached. No sacrificial rings thus may be required to maintain consistency given the rigid lamination stack 180. As described above, the outer cooling jacket 160 may be in communication with the cooling manifold 170. Other configurations may be used herein. A second end shield 330 may be positioned on the stator subassembly 310 so as to form a completed stator 110. An additional amount of epoxy may be placed between the poles 240 and the stator tip and cooling assembly 150 to improve the conduction path therethrough. Other types of assembly methods may be used herein.

The stator 110 with the stator tip and cooling assembly 150 thus cools the poles 240 about the tooth tips 250. As described above, a significant portion of heat may be generated about the tooth tip area. By cooling the tooth tips 250, overall machine power density may be increased. Moreover, the stator tip and cooling assembly 150 effectively cools the overall stator 110, especially at higher speeds. The ring subassembly 270 of the stator tip and cooling assembly 150 also integrates the tooth tips 250 and the cooling tubes 300 therein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A stator, comprising:
   a plurality of poles; and
   a stator tip and cooling assembly;
   the stator tip and cooling assembly comprising a plurality of stator tips with a plurality of cooling tubes adjacent thereto such that the plurality of stator tips aligns with the plurality of poles and the plurality of cooling tubes cools the plurality of poles.

2. The stator of claim 1, wherein each of the plurality of poles comprises a tooth and a coil and wherein the each of the plurality of stator tips aligns with a tooth and wherein each of the plurality of cooling tubes aligns with a coil.

3. The stator of claim 1, wherein the stator tip and cooling assembly comprises a plurality of spacers positioned between the plurality of stator tips.

4. The stator of claim 3, wherein each of the plurality of spacers comprises a cooling channel therein and wherein the plurality of cooling tubes are positioned within the cooling channels.

5. The stator of claim 3, where the plurality of stator tips and the plurality of spacers comprise a ring subassembly.

6. The stator of claim 3, wherein the plurality of spacers comprises an epoxy spacer.

7. The stator of claim 1, further comprising an outer cooling jacket positioned thereon.

8. The stator of claim 7, further comprising a cooling manifold in communication with the stator tip and cooling assembly and the outer cooling jacket.

9. The stator of claim 1, further comprising a stack and wherein the plurality of poles extends therefrom.

10. An electrical device, comprising:
    a rotor; and
    a stator positioned about the rotor;
    the stator comprising a plurality of poles and a stator tip and cooling assembly to cool the plurality of poles; where each pole includes a tooth and wherein the stator tip and cooling assembly is in flush contact with each tooth.

11. The electrical device of claim 10, wherein the stator tip and cooling assembly comprises a plurality of stator tips with a plurality of cooling tubes adjacent thereto.

12. The electrical device of claim 11, wherein each of the plurality of poles further comprises a coil and wherein the each of the plurality of stator tips aligns with a tooth and wherein each of the plurality of cooling tubes aligns with a coil.

13. The electrical device of claim 11, wherein the stator tip and cooling assembly comprises a plurality of spacers positioned between the plurality of stator tips.

14. The electrical device of claim 13, wherein each of the plurality of spacers comprises a cooling channel therein and wherein the plurality of cooling tubes are positioned within the cooling channels.

15. The electrical device of claim 10, wherein the stator comprises an outer cooling jacket positioned thereon.

16. The electrical device of claim 15, wherein the stator comprises a cooling manifold in communication with the stator tip and cooling assembly and the outer cooling jacket.

* * * * *